US009593544B2

(12) United States Patent
Messmer et al.

(10) Patent No.: US 9,593,544 B2
(45) Date of Patent: Mar. 14, 2017

(54) CLAMP ASSEMBLY (71) Applicant: MONUMENT MACHINE SHOP LTD., Calgary, Alberta (CA)

(72) Inventors: Leonard Messmer, Calgary (CA); Timothy Pickford, Calgary (CA); Michael Thomas Patrick Sutherland, Calgary (CA); Lauren Giang, Calgary (CA)

(73) Assignee: MONUMENT MACHINE SHOP LTD., Calgary, Alberta (CA)

( * ) Notice: Subject to any disclaimer, the term of this patent is extended or adjusted under 35 U.S.C. 154(b) by 312 days.

(21) Appl. No.: 14/244,976

(22) Filed: Apr. 4, 2014

(65) Prior Publication Data

US 2014/0299313 A1    Oct. 9, 2014

(30) Foreign Application Priority Data

Apr. 5, 2013   (ZA) .................................. 2013/2448

(51) Int. Cl.
| | | |
|---|---|---|
| *E21B 19/16* | (2006.01) | |
| *B25B 5/16* | (2006.01) | |
| *F16B 2/10* | (2006.01) | |
| *F16L 3/10* | (2006.01) | |

(52) U.S. Cl.
CPC .............. *E21B 19/161* (2013.01); *B25B 5/16* (2013.01); *E21B 19/163* (2013.01); *F16B 2/10* (2013.01); *F16L 3/10* (2013.01)

(58) Field of Classification Search
CPC ....... E21B 19/161; E21B 19/163; B25B 5/16; F16B 2/10; F16L 3/10; F16L 3/1066
See application file for complete search history.

(56) References Cited

U.S. PATENT DOCUMENTS

| | | | | |
|---|---|---|---|---|
| 1,337,509 | A * | 4/1920 | Fletcher ................ | E21B 19/161 81/90.1 |
| 1,575,141 | A * | 3/1926 | Wilson .................. | E21B 19/161 81/90.8 |
| 6,116,118 | A * | 9/2000 | Wesch, Jr. .............. | B25B 5/147 81/57.16 |
| 6,237,445 | B1 * | 5/2001 | Wesch, Jr. .............. | B25B 5/147 81/57.18 |
| 7,076,852 | B2 * | 7/2006 | Penman ................ | B23P 19/061 285/38 |
| 7,114,234 | B2 * | 10/2006 | Penman ................ | B23P 19/061 29/235 |
| 7,665,530 | B2 * | 2/2010 | Wells ...................... | E21B 19/16 166/377 |
| 8,413,728 | B2 * | 4/2013 | Ledbetter .............. | E21B 19/163 166/377 |
| 8,544,914 | B2 * | 10/2013 | Hessels ................. | E21B 19/163 294/106 |

(Continued)

*Primary Examiner* — Nicole Coy (74) *Attorney, Agent, or Firm* — Michael Best & Friedrich LLP (57) ABSTRACT

A clamp assembly which includes two spaced apart jaw systems each of which has two sets of spaced apart relatively pivotal grip formations, wherein the jaw systems are relatively pivotally movable to position the four sets of grip formations at spaced apart locations on a circumference of a circle, wherein the size of the circumference is determined at least by the extent of relative pivotal movement of the jaw systems.

7 Claims, 9 Drawing Sheets

(56) References Cited

U.S. PATENT DOCUMENTS

| | | | |
|---|---|---|---|
| 8,967,278 B2* | 3/2015 | Sugden | E21B 19/163 |
| | | | 166/380 |
| 9,139,402 B2* | 9/2015 | Dodge, IV | B66C 1/445 |
| 2005/0166715 A1* | 8/2005 | Rogers | E21B 19/161 |
| | | | 81/57.16 |
| 2007/0044592 A1* | 3/2007 | Childress, II | E21B 19/163 |
| | | | 81/57.34 |
| 2015/0107420 A1* | 4/2015 | Webb | E21B 19/163 |
| | | | 81/57.34 |

* cited by examiner

CLAMP ASSEMBLY

BACKGROUND OF THE INVENTION

This invention relates to a clamp assembly.

The invention is concerned particularly with a clamp assembly which is suitable for use with an elongate cylindrical component such as a pipe or tube which may form part of a drill string which is used in a drilling operation. The invention is described with reference to this application but this is exemplary only and non-limiting.

During drilling operations and thereafter, e.g. when lining a borehole, elongate lengths of drill rods or casings which are axially aligned must be screwed together, or unscrewed so that they can be separated. Drilling conditions can be arduous and it is important to be able to secure a pipe or casing with ease so that the requisite forces can be applied for coupling or uncoupling operations, as may be required.

A further factor is that drill rods, for example, come in a range of standard sizes and a clamping system suited for a drill rod of one size may not work satisfactorily with a drill rod of a different size.

An object of the present invention is to address, at least to some extent, the aforementioned requirements.

SUMMARY OF THE INVENTION

In a broad sense the invention provides a clamp assembly which includes two spaced apart jaw systems each of which has two sets of spaced apart relatively pivotal grip formations, wherein the jaw systems are relatively pivotal to position the four sets of grip formations at spaced apart locations on a circumference of a circle wherein the size of the circumference is determined at least by the extent of relative pivotal movement of the jaw systems.

More particularly the invention provides a clamp assembly which includes:
support structure with a reference plane;
first and second jaw systems;
wherein the first jaw system and the second jaw system are substantially identical to each other and each jaw system respectively includes:
a support member which is mounted to the support structure for limited relative rotation about a first pivot axis;
a first grip member which is mounted to the support member for limited relative rotation about a second pivot axis;
first grip formations on the first grip member;
a guide lever which is mounted, at one end, to the support structure for limited relative rotation about a third pivot axis and, at an opposing end, to the first grip member for limited relative rotation about a fourth pivot axis;
an actuator which acts between the support structure and the support member;
a second grip member which is mounted to the support member; and
second grip formations on the second grip member;
wherein the first pivot axis, the second pivot axis, the third pivot axis and the fourth pivot axis are parallel to one another and to the reference plane,
wherein the first jaw system is located on a first side of the reference plane and the second jaw system is located on a second side of the reference plane, the jaw systems are disposed in opposing orientations, whereby the first grip formations of the first jaw system are spaced from and oppose the first grip formations of the second jaw system; and the second grip formations of the first jaw system are spaced from and oppose the second grip formations of the second jaw system; and wherein
the first jaw system and the second jaw system are interconnected so that, upon operation of at least one actuator, the support members of the first and second jaw systems are constrained to move angularly through arcs of equal size but in opposing senses of rotation.

The support structure may be of any suitable form and, in one form of the invention, is in the nature of a pedestal with opposed legs and a crosspiece between the legs.

The respective support member in each jaw system may be of any suitable kind and, for example, may be in the nature of a clevis formed by first and second spaced apart clevis plates.

In each jaw system the first grip member may be mounted between the first and second clevis plates.

The actuator may be of any appropriate kind and, for example, may comprise a piston and cylinder assembly which may be operated by means of a pressurised fluid e.g. compressed air or a hydraulic fluid.

The jaw systems may be interconnected by means of meshing gears, provided on the first and second jaw systems, which may be in the nature of spur gears.

The second grip members of the two jaw systems may be positioned so that the second grip formations are relatively close to each other.

The configuration of the clamp assembly may be such that the first grip formations of the two jaw systems are movable between first limiting positions at which there is a maximum spacing between the two first grip formations, and second limiting positions at which the first grip formations of the jaw systems are substantially adjacent each other and are substantially adjacent the second grip formations.

BRIEF DESCRIPTION OF THE DRAWINGS

The invention is further described by way of example with reference to the accompanying drawings in which:

FIGS. 5 and 6, and FIGS. 7 and 8, respectively, are the same as FIGS. 3 and 4 but, in the case of FIGS. 5 and 6 show how a pipe of medium diameter is engaged by the clamp assembly, and wherein FIGS. 7 and 8 show how a small diameter pipe is engaged by the clamp assembly.

DESCRIPTION OF PREFERRED EMBODIMENT

Figures 1, 10:
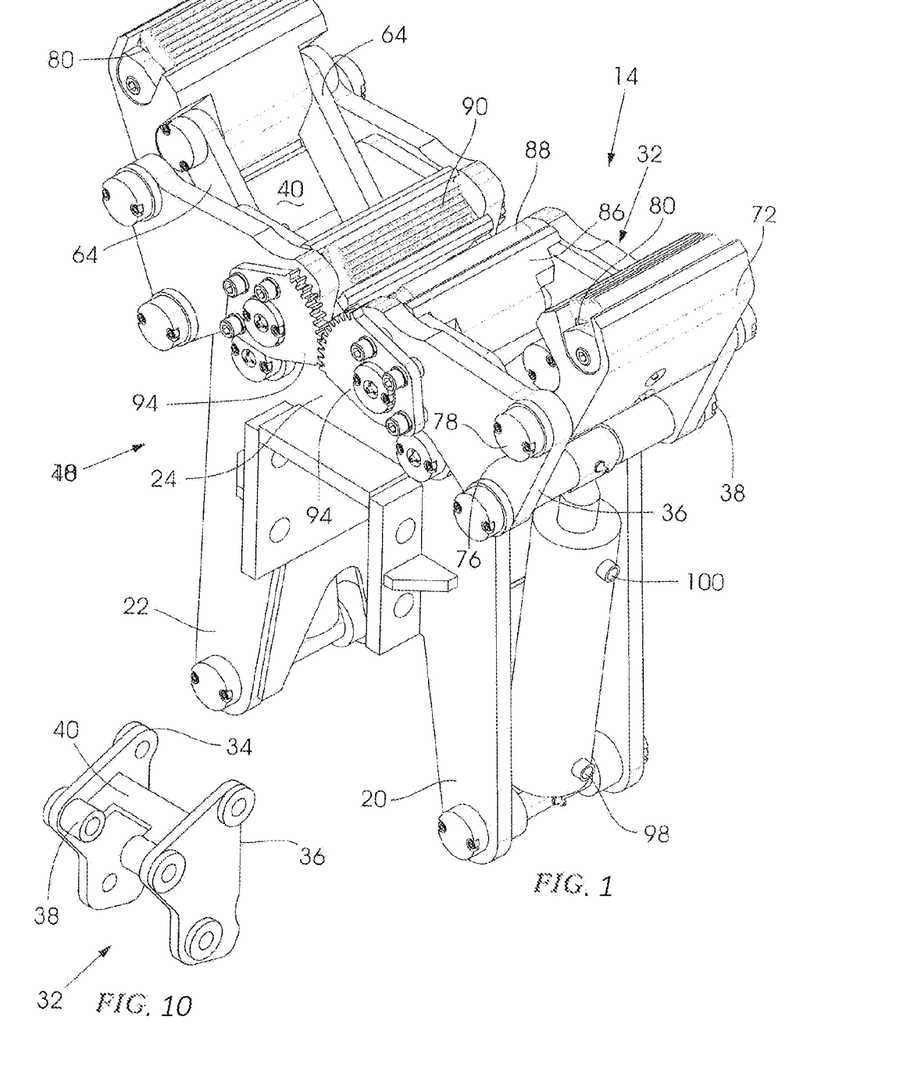
FIG. 1 is a perspective view of a clamp assembly according to the invention.
FIG. 10 is a perspective view of a support member of the clamp assembly of FIG. 1.
Figure 2:
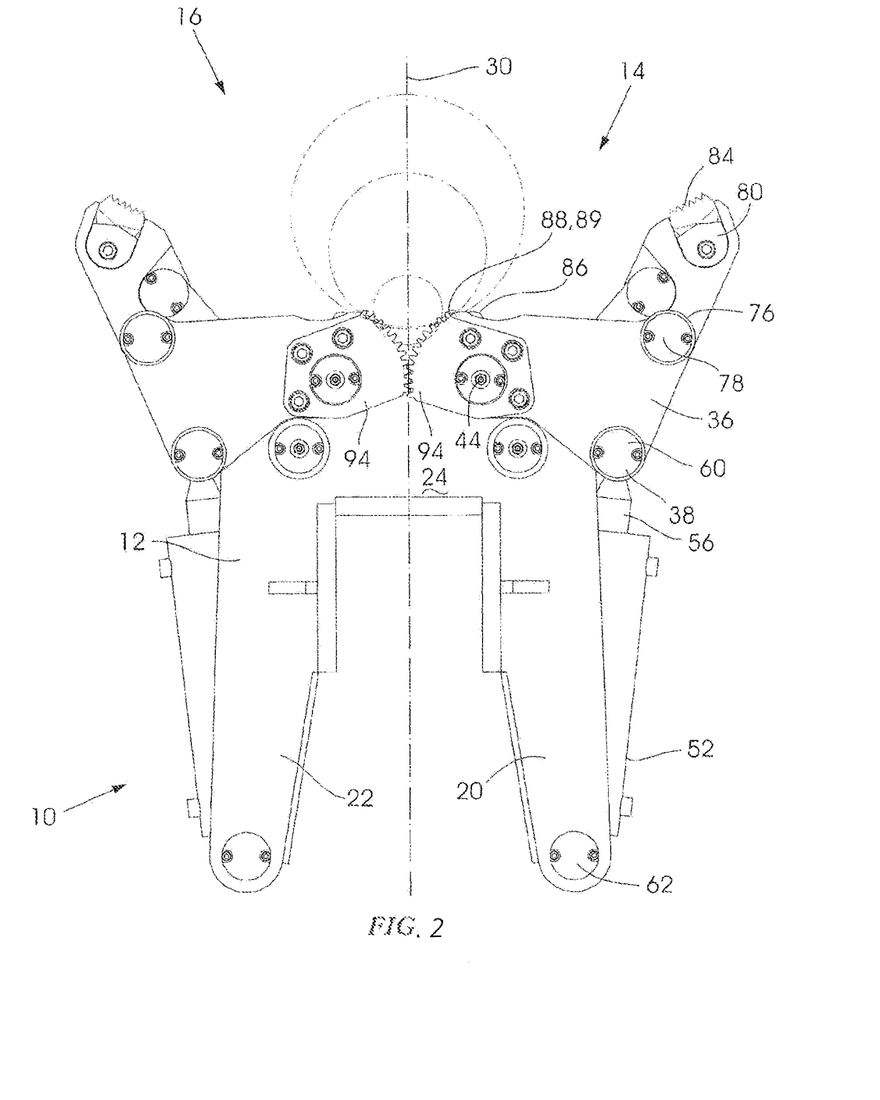
FIG. 2 is a view in elevation of the clamp assembly of FIG. 1 with certain outermost components removed in order to illustrate internal structural aspects of the clamp assembly.

FIG. 1 of the accompanying drawings illustrates, in perspective, a clamp assembly 10 according to the invention. FIG. 2 shows the clamp assembly in elevation with certain components on an outer side of the clamp assembly omitted in order to illustrate various internal constructional details of the clamp assembly.

The clamp assembly includes support structure 12, a first jaw system 14 and a second jaw system 16.

The support structure 12 is, in this form of the invention, in the form of a pedestal and includes opposing pairs of legs 20 and 22 respectively and a crosspiece 24 at an upper end of the legs.

The first and second jaw systems are for all practical purposes identical to each other. The first jaw system 14 is on one side of a centrally positioned reference plane 30 which passes through the support structure. The second jaw system 16 is on an opposing side of the reference plane. The jaw systems are oppositely orientated i.e. viewed from one side, one jaw system is a mirror image of the other. For this reason the construction of the first jaw system 14 only is described hereinafter.

The jaw system 14 includes a support member 32 which is in the nature of a clevis and which includes a first clevis plate 34, a spaced apart second clevis plate 36, a shaft with aligned bushes 38 between the plates 34 and 36, and a brace member 40 (refer to the jaw system 16D in FIG. 1) which securely interconnects the plates to each other. FIG. 10 illustrates, more clearly, the components 34, 36, 38 and 40.

The support member 32 is mounted to an upper part of the leg 20, and an adjacent part of the crosspiece 24, for movement about a first pivot axis 44 which is parallel to the reference plane 30.

An actuator 50, in the form of a cylinder 52 and a piston 54 which has a protruding piston rod 56 (see FIG. 4), is mounted at one end to a shaft 60 which forms a lower pivot axis 62 and, at an upper end of the piston rod, to the shaft and bushes 38 of the support member which define a pivot axis 60 which is parallel to the axis 44.

Two parallel guide levers 64 (refer to the jaw system 16 in FIG. 1) which are spaced apart from each other are pivotally mounted to the support structure 12 for movement about a pivot axis 68 which is parallel to the pivot axis 44. The levers 64 are connected at an upper pivot axis 70 to a grip member 72 which extends between the upper ends of the levers. The axis 70 is parallel to the axis 44. The grip member 72 is located partly between the clevis plates 34 and 36 and is pivotally connected thereto by means of a shaft 76 which lies on a pivot axis 78 which is parallel to the axis 44. A profiled retainer member 80 is engaged with an upper end of the grip member. The retainer member 80 carries an array of serrated grip formations 84. The retainer member is designed to allow limited rotational movement of the grip formations 84 relative to the grip member 72.

A second grip member 86, is positioned between and secured to the clevis plates 34 and 36, and is aligned on the pivot axis 44. The grip member 86 is rotatable together with the clevis plates 34 and 36 about the axis 44. A profiled retainer member 88, which is fixed to the second grip member 86, carries an array of second serrated grip formations 90.

Each jaw system 14, 16 carries a respective spur gear 94 which is fixed to an outer side of the respective clevis plates 36 and which is centred on the respective pivot axis 44. FIGS. 1 and 2 show that the two spur gears 94 are meshed with each other.

The various rotational surfaces, shafts and the like are mounted in bushings or bearings according to good engineering practice and are provided with grease and lubrication points as may be necessary.

The actuator 50, in each respective jaw system, is hydraulically operable. If hydraulic fluid is introduced under pressure into a lower port 98 then the piston rod 56 is extended from the cylinder 52. If pressurised hydraulic fluid is introduced into an upper port 100 then the piston rod 56 is retracted into the cylinder 52.

FIG. 2 illustrates, in outline, three elongate elements, solid or tubular, e.g. pipes or casings 106, 108 and 110 respectively, which have different diameters. The clamp assembly of the invention is designed to deal with cylindrical elements which can have diameters lying in a large range and the elements 106, 108 and 110 are exemplary only.

Figure 3:
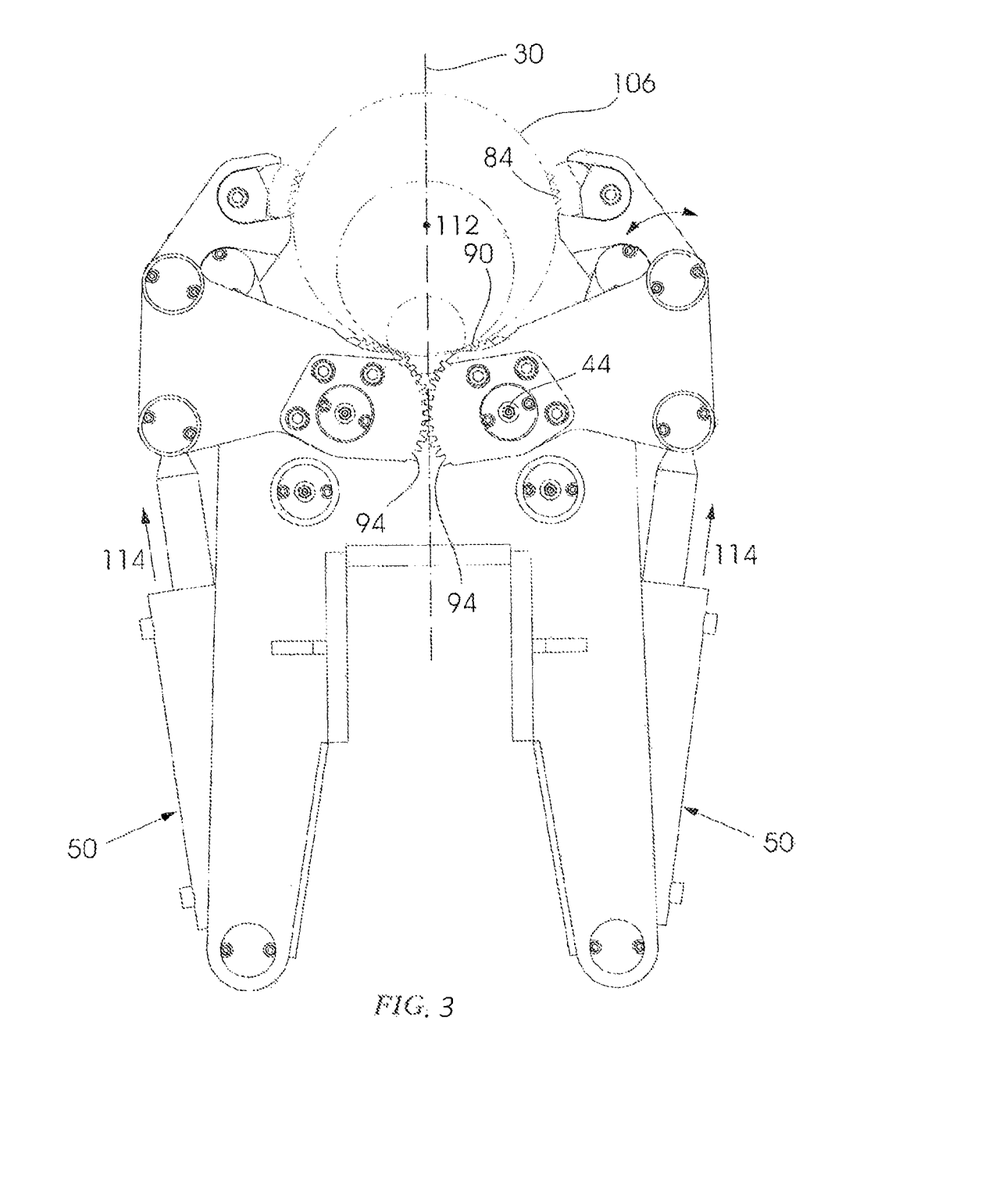
FIG. 3 shows the clamp assembly in elevation in a configuration at which it can clamp a large diameter pipe.
Figure 4:
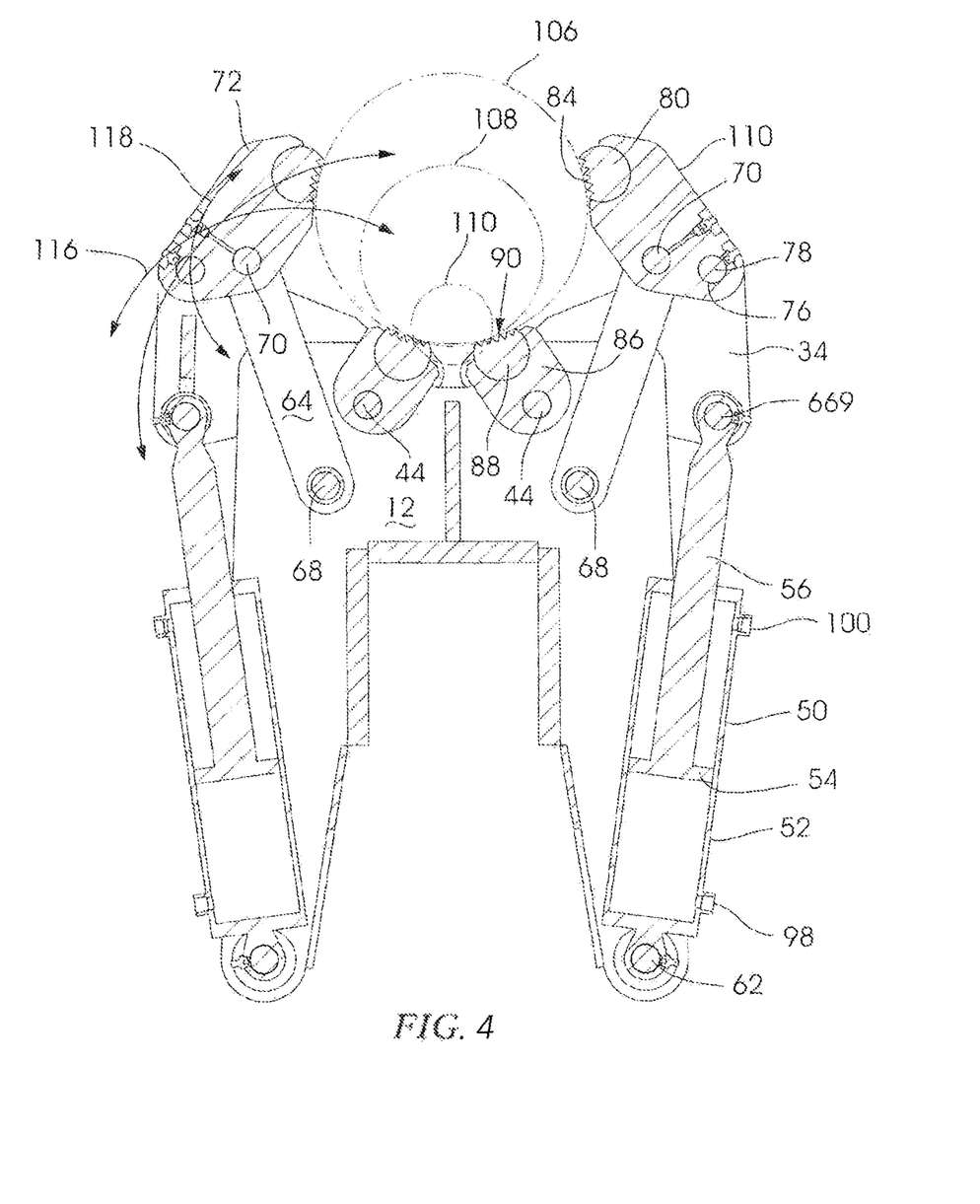
FIG. 4 is similar to FIG. 3 but with some parts sectioned and with the aforementioned external components removed.
Figure 5:
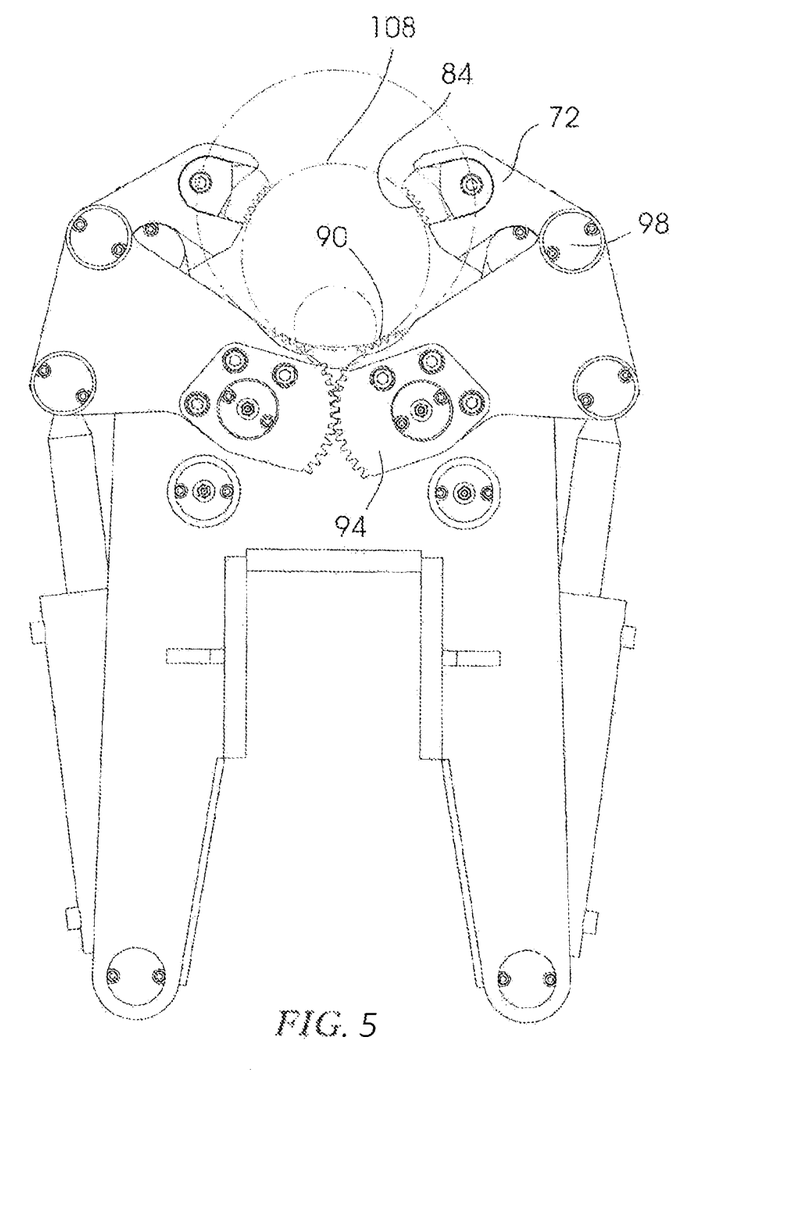
Figure 6:
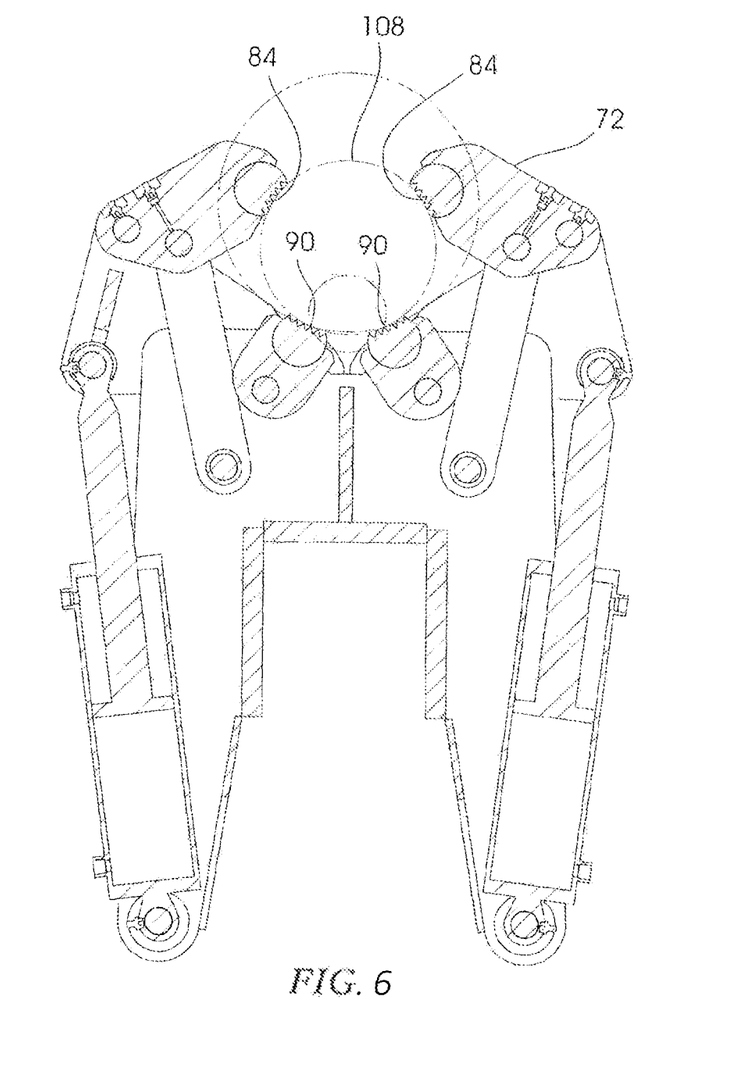
Figure 7:
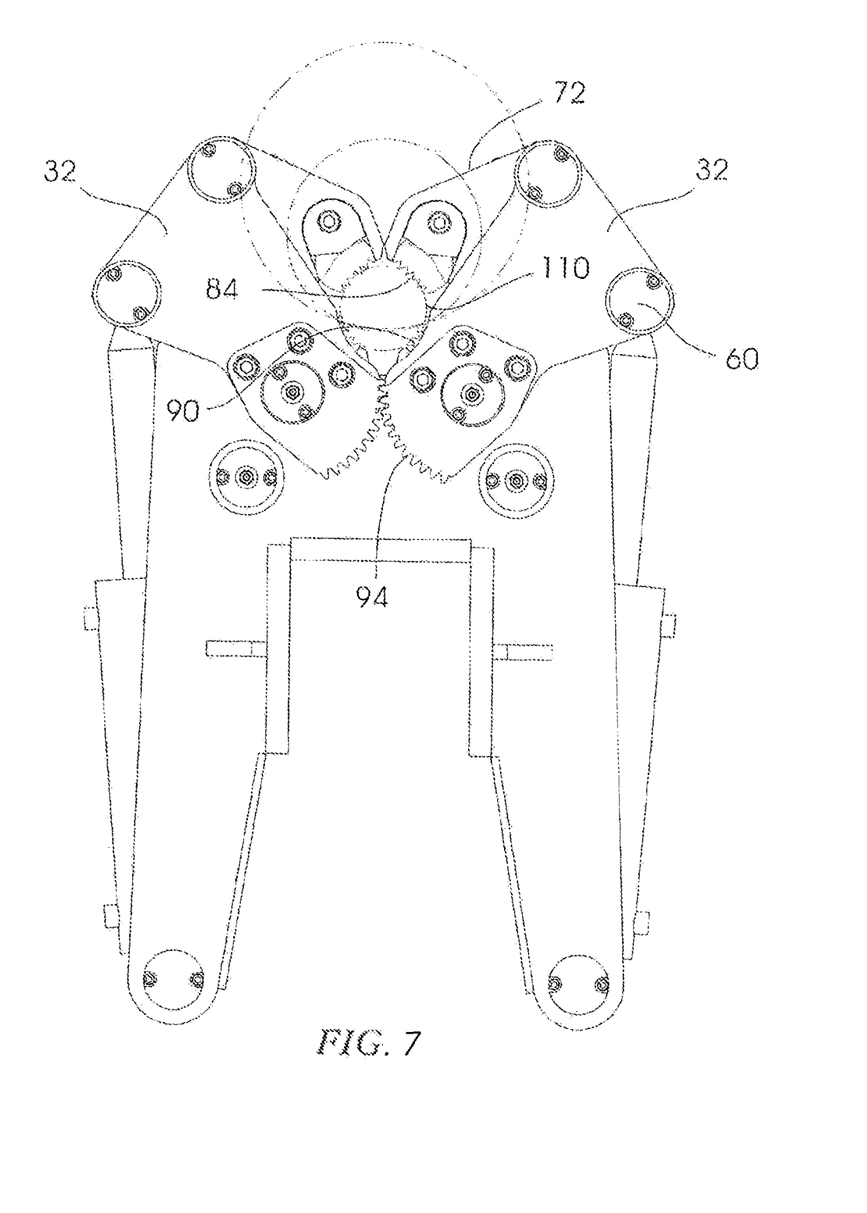
Figure 8:
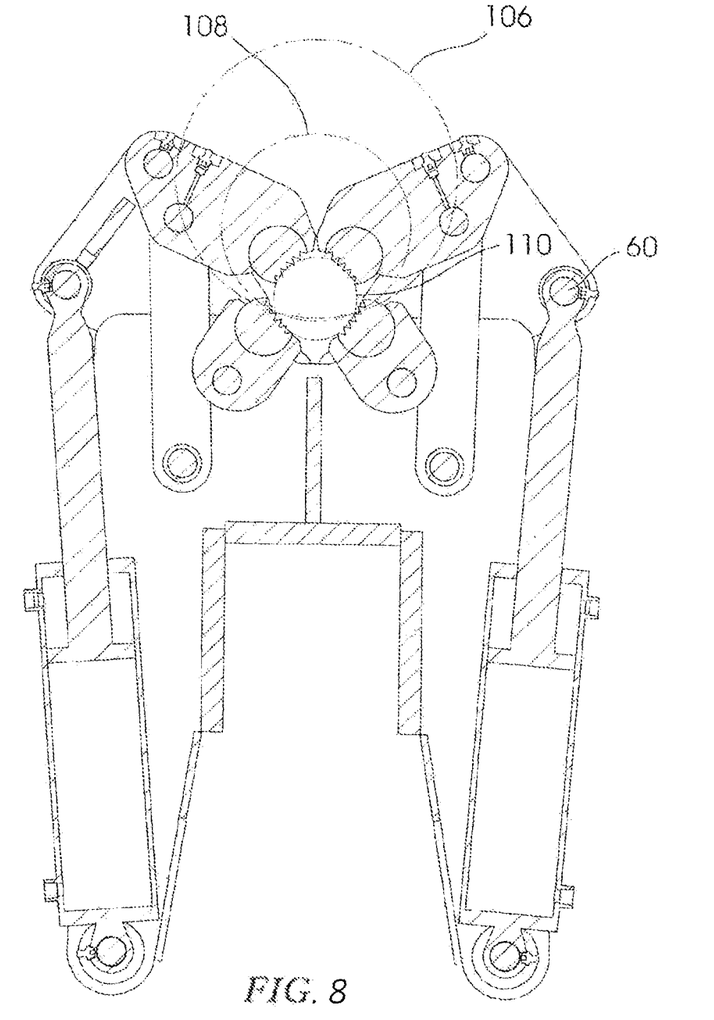

FIGS. 3 and 4 illustrate the clamp assembly actuated to engage with a large diameter element 106. FIGS. 5 and 6 show the clamp assembly engaged with a medium diameter element 108 and FIGS. 7 and 8 shows the clamp assembly engaged with a small diameter element 110.

The second grip formations 90 of the two jaw systems are close to one another and, in the illustrations, generally face each other. These grip formations are symmetrically located on opposing sides of the reference plane 30. Assume that the cylindrical element 106 is positioned on the gripping formations 90, as shown in FIG. 3 for example. An elongate axis 112 of the element 106 normally lies within the plane 30. Also the axis 112 is generally parallel to the pivotal axis 44 and thus to the other axes which have been referred to.

The two actuators 50 are operated as far as possible in unison. Pressurised hydraulic fluid is introduced into each cylinder 52 to cause the corresponding piston rod 56 to extend from the cylinder, as is indicated by arrows 114 in FIG. 3. The resulting movement is fairly complex. The support member 32, i.e. the clevis, can only move in a rotational sense to and fro about the pivot axis 44 on each side. The levers 64, which are fixed to the support structure 12, pivot about the pivot axis 68. The pivot axis 70 thus moves along an arc 116—see FIG. 4. However the grip member 72 is mounted to the levers 64 and to the clevis plates 34, 36 and can be moved along an arc 118 (about the axis 70) which has a smaller radius than the radius of the arc 116.

Additionally, when the clevis plates 34, 36 are pivoted, the grip member 86 moves about the pivot axis 44.

The nature of the pivotal movement of each of the various components is such that, in one sense, it can be said that levers 64 are moved through a fairly large arc to bring the grip formations 84 rapidly to oppose an outer surface of the cylindrical element 106. Further extension of the piston rod then effectively causes the grip member 72 to pivot about the axis 70 and the grip formations 84 are brought into tight engagement with an outer surface of the cylindrical element 106.

The two sets of grip formations 84 are spaced apart by a distance which is less than the diameter of the element 106. Also, the grip formations 84 are located on a line which is above a diameter of the element 106 which is transverse to the plane 30. Thus the element 106 is urged towards and into tight engagement with, the grip formations 90.

The two jaw systems, as described, are interlinked by means of the meshing spur gears 94. Thus angular movement of one jaw system in one direction or sense is matched by angular movement of the other jaw system to the same angular extent but in a different rotational direction or sense.

The aforementioned gripping process is repeated when the clamp assembly is used with cylindrical elements which have smaller diameters than the element 106. For example FIG. 5 and FIG. 6 show the clamp assembly engaged with the element 108. The support members/clevis plates are pivoted to a greater extent in FIG. 5 (to what is shown in FIG. 3) and the grip member 72 is also pivoted, about the axis 78, to a greater extent in FIG. 5. In this respect the extent of pivotal movement of the grip member 72 is determined by the degree of pivotal movement of the support member 32 and the degree of pivotal movement of the grip member 72, relative to the support member 32.

As is shown in FIG. 5 the grip formations 84 are engaged with a surface of the element 108 at a location which causes the grip formations to push the element towards the second grip formations 90.

In the configuration shown in FIGS. 7 and 8 the clamp assembly has been actuated to another limiting position. The support members 32 are pivoted away from the respective actuators 50 to a maximum extent and the corresponding grip members 72 are pivoted inwardly and downwardly to a maximum extent. The grip formations 84 of the two jaw systems are substantially adjacent each other. These Figures represent a situation in which the clamp assembly is used with the small diameter element 110.

It is apparent from the comparison of FIGS. 3 and 4, 5 and 6 and 7 and 8 that the clamp assembly is actuable to position the four sets of grip formations on the circumferences of respective circles of different diameters. Each elongate element, in cross-section, has a circular outline of a particular diameter. The relative pivotal movement of the jaw systems which, via the linkages referred to cause corresponding and controlled movement of the gripping formations, is such that the gripping formations are caused to take up positions spaced apart from one another which lie on the circumference of the particular tubular element which is engaged with the clamp assembly.

Figure 9:
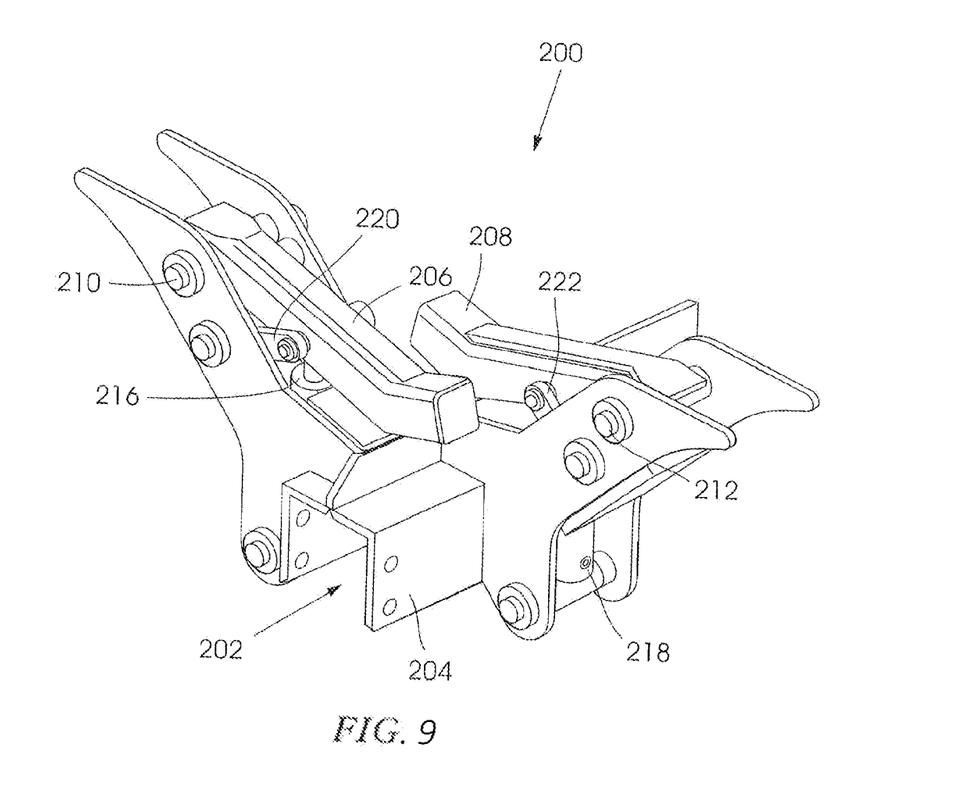
FIG. 9 is a perspective view of a kicker assembly which is usable in conjunction with the clamp assembly.

FIG. 9 illustrates in perspective a kicker assembly 200 which is usable in conjunction with the clamp assembly 10. The kicker assembly is constructed about a longitudinal axis 202 which in use is positioned on the plane 30.

The kicker assembly has a supporting arrangement 204 which extends to opposed sides of the plane 30 and, fixed to the arrangement 204, are two inwardly and downwardly inclined kicker arms 206 and 208 respectively. These arms are bent and positioned so that, in use, they underlie a lower surface of an elongate element (106, 108 or 110, by way of example only), which is engaged with the jaw assembly 10. The kicker arms are pivotally mounted at points 210, 212 to the arrangement 204 and are acted on by respective hydraulic actuators 216 and 218 respectively which are fixed to the arrangement 204. Additionally, links 220 and 222 pivotally connect the kicker arms to the arrangement 204.

In use an elongate element with which the clamp assembly 10 is engaged lies in a cradle formed by the shaped kicker arms 206, 208. In order to lift the elongate element from the clamp assembly, the jaw systems thereof are released and, thereafter, the actuators 216 and 218 are energised and, in the process, the kicker arms 206 and 208 are pivoted about the points 210 and 212. This lifts the elongate element from the clamp assembly and helps to unload the element from the clamp assembly. The use of the kicker assembly facilitates the way in which the clamp assembly is employed.

An advantage of the invention lies in the fact that the clamp assembly can be actuated rapidly and precisely, using suitable hydraulic control techniques. The actuators (piston and cylinder assemblies) are operated with ease and exert significant clamping forces on an elongate element e.g. pipe or casing, as the case may be, which is positioned to lie on the grip formations 90. There is no need to adjust the clamp assembly beforehand so that it can work with pipes of different diameters. It is possible to use a pressure release valve or a pressure sensor which detects the maximum pressure in the actuators—this parameter determines the clamping force applied by the gripping formations. Thus, irrespective of the diameter of the element with which the clamp assembly is used, an automatic technique can be implemented to ensure that a suitable clamping force is applied to the pipe or casing and that the clamping force is not so high as to cause damage to the element.

The clevis plates 34 and 36 can if necessary be replaced with plates of different sizes to enable pipes, which lie in a different range of sizes, to be gripped. This adjustment can be done without changing the remaining components.

The retainer members 80 and 88, which carry the grip formations, are wear items and will require replacement. The design of the clamp assembly is such that these items, when worn, can be removed and can then be replaced with new parts.

As is shown, for example in FIG. 2, the jaw systems 14 and 16 can be spread wide apart to positions which facilitate loading of a pipe into the clamp assembly from, for example, an automatic pipe feeding device. There is virtually no restriction in this regard. The clamp assembly can be used effectively with any pipe provided an included angle between the opposing sets of grip formations 84, when they are brought into contact with an outer surface of the pipe, is at least 180°.

The invention claimed is:

1. A clamp assembly which includes:
   support structure with a reference plane;
   first and second jaw systems;
   wherein the first jaw system and the second jaw system are substantially identical to each other and each jaw system respectively includes:
   a support member which is mounted to the support structure for limited relative rotation about a first pivot axis;
   a first grip member which is mounted to the support member for limited relative rotation about a second pivot axis;
   first grip formations on the first grip member;
   a guide lever which is mounted, at one end, to the support structure for limited relative rotation about a third pivot axis, which is spaced from and parallel to the second pivot axis, and, at an opposing end, to the first grip member for limited relative rotation about a fourth pivot axis, which is spaced from and parallel to the third pivot axis and to the second pivot axis;
   an actuator which acts between the support structure and the support member;
   a second grip member which is mounted to the support member; and
   second grip formations on the second grip member;
   wherein the first pivot axis, the second pivot axis, the third pivot axis and the fourth pivot axis are parallel to one another and to the reference plane,
   wherein the first jaw system is located on a first side of the reference plane, the second jaw system is located on a second side of the reference plane, and the jaw systems are disposed in opposing orientations, whereby the first grip formations of the first jaw system are spaced from and oppose the first grip formations of the second jaw system; and
   the second grip formations of the first jaw system are spaced from and oppose the second grip formations of the second jaw system; and wherein
   the first jaw system and the second jaw system are interconnected so that, upon operation of at least one actuator, the support members of the first and second jaw systems are constrained to move angularly through arcs of equal size but in opposing senses of rotation.

2. A clamp assembly according to claim 1 wherein the support structure includes a pedestal with opposed legs and a crosspiece between the legs.

3. A clamp assembly according to claim 1 wherein each support member respectively includes a clevis formed by first and second spaced apart clevis plates.

4. A clamp assembly according to claim 3 wherein, in each jaw system the first grip member is mounted between the first and second clevis plates.

5. A clamp assembly according to claim 1 wherein the actuator comprises a piston and cylinder assembly.

6. A clamp assembly according to claim 1 which includes meshing gears, provided on the first and second jaw systems which interconnect the jaw systems.

7. A clamp assembly according to claim 1 wherein the first grip formations of the two jaw systems are movable between first limiting positions at which there is a maximum spacing between the two first grip formations, and second limiting positions at which the first grip formations of the jaw systems are substantially adjacent each other and are substantially adjacent the second grip formations.

* * * * *